(12) United States Patent
Lautenbach et al.

(10) Patent No.: US 8,668,747 B2
(45) Date of Patent: Mar. 11, 2014

(54) AQUEOUS DYE DISPERSIONS

(75) Inventors: Holger Lautenbach, Rheinfelden (DE); Rainer Hans Traber, Reinach (CH); Heidemarie Urbing, Uffheim (FR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/144,145

(22) PCT Filed: Jan. 29, 2010

(86) PCT No.: PCT/EP2010/051075
§ 371 (c)(1), (2), (4) Date: Aug. 12, 2011

(87) PCT Pub. No.: WO2010/089255
PCT Pub. Date: Aug. 12, 2010

(65) Prior Publication Data
US 2011/0296632 A1    Dec. 8, 2011

(30) Foreign Application Priority Data
Feb. 4, 2009    (EP) .................................... 09152097

(51) Int. Cl.
*C09B 29/36*    (2006.01)
*D06P 3/62*    (2006.01)

(52) U.S. Cl.
USPC .................................. 8/684; 8/636; 162/162

(58) Field of Classification Search
USPC ........................................................ 8/636
See application file for complete search history.

(56) References Cited

U.S. PATENT DOCUMENTS

| | | | |
|---|---|---|---|
| 3,788,802 A * | 1/1974 | Litke .................................. | 8/684 |
| 5,143,519 A | 9/1992 | Stingelin | |
| 5,153,317 A * | 10/1992 | Ortega et al. ..................... | 8/543 |
| 5,173,086 A | 12/1992 | Bermes | |
| 5,697,985 A | 12/1997 | Good et al. | |
| 5,840,789 A * | 11/1998 | Verstrat et al. ................. | 524/156 |
| 2003/0164475 A1 | 9/2003 | Malisz | |
| 2005/0071932 A1* | 4/2005 | Lautenbach et al. .............. | 8/405 |
| 2007/0186805 A1 | 8/2007 | Schene | |

FOREIGN PATENT DOCUMENTS

| | | |
|---|---|---|
| EP | 0 457 092 A | 10/1991 |
| EP | 0 479 056 A | 4/1992 |
| EP | 0 747 450 A | 12/1996 |
| WO | 01/32786 A | 5/2001 |
| WO | 01/90257 A | 11/2001 |
| WO | 03/064539 A | 8/2003 |
| WO | 2005/054376 A | 6/2005 |
| WO | 2005/087872 A | 9/2005 |
| WO | 2006/122891 A | 11/2006 |

* cited by examiner

*Primary Examiner* — Harold Pyon
*Assistant Examiner* — Katie L Hammer
(74) *Attorney, Agent, or Firm* — Shruti Costales

(57) ABSTRACT

The present invention relates to storage stable aqueous dye dispersions, comprising (a) 2.0 to 30.0% by weight, based on the sum of (a), (b) and (c), of a dye of the formula (3) in which KK is a residue of a coupling component; (b) 0.1 to 20.0 % by weight, based on the sum of (a), (b) and (c), of at least one additive selected from the group consisting of wetting agents, dispersing agents, rheology modifiers, and preservatives; and (c) 50.0 to 97.9% by weight, based on the sum of (a), (b) and (c), of water. The invention moreover relates to a process for their preparation and the use thereof for the dyeing, in particular of paper.

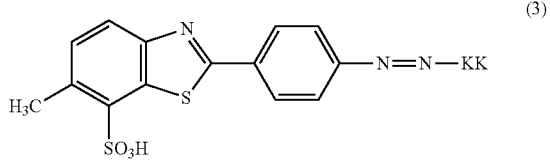

(3)

13 Claims, No Drawings

AQUEOUS DYE DISPERSIONS

The present invention relates to storage stable aqueous dye dispersions, a process for their preparation and the use thereof for dyeing, in particular of paper.

Dispersions of direct dyes are generally known. For example, dispersions of direct dyes based on DHTPTA (Dehydrothio-p-toluidinesulfonic acid) as sodium salt are known. However, these salts can be diluted only slowly with water. Moreover, it is difficult to obtain highly concentrated dispersions of salts of direct dyes.

WO 2003/064539 discloses an aqueous dye solution, comprising
a) 5 to 30% by weight of a dye of the formula

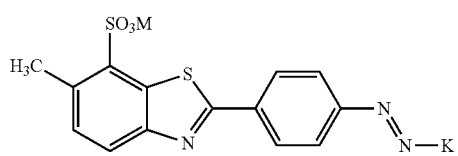

(1)

in which K is a residue of a coupling component of the acetoacetanilide, pyridone, pyrazolone or pyrimidine series and M is hydrogen, an alkali metal or alkaline earth metal, ammonium or alkyl ammonium,
b) 0.05 to 5% by weight of one or more compounds of the formula

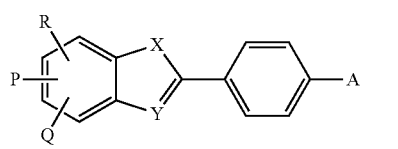

(2)

in which A is a specific substituent, X represents O, S or $NR_1$; Y represents N or $CR_1$ and P, Q and R, independently of one another, represent hydrogen, $C_1$-$C_4$alkyl, —$SO_3M$, —$PO_3M$, —$CO_2M$, —OH, —$NO_2$ or —$COR_1$,
c) an organic or an inorganic base or mixtures thereof,
d) if desired, further additives, and
e) water.

EP 0 747 450 discloses a process for the preparation of storage-stable dye dispersions of alkali metal salts of anionic azo direct dyes stabilized by viscosity enhancing agents, which comprises preparing an aqueous slurry of an alkali metal salt of an azo direct dye, said salt having a solubility in water at 25° C. of about 15% by weight, by azo coupling one or more aromatic diazonium salts with one or more couplers while maintaining a pH of at least about 5 by adding a basic alkali metal compound in the absence of a nitrogen-containing base; optionally agitating the aqueous slurry at a temperature of 5° C. to 100° C. for up to about six hours; optionally cooling the aqueous slurry to a temperature of 5° C. to 40° C.; and adding to the aqueous slurry a viscosity enhancing agent in an amount sufficient to obtain a viscosity of 500 to 5000 centipoise and 0 to 10% by weight, based on the total weight of the dye dispersion, of a humectant, thereby forming the storage-stable dye dispersion. The viscosity enhancing agent is for example an anionic polysaccharide such as xanthan gum.

WO 2005/054376 discloses storage-stable concentrated aqueous dye preparations of anionic dyes which are producible in that an aqueous solution or suspension of at least one anionic crude specific naphthaline sulfonic acid diazo dye is subjected to ultrafiltration and subsequent concentration, and wherein no additional solubilizers, dispersants or tensides are used. Ultrafiltration is carried out in order to remove salts and synthesis byproducts. The counterions of the anionic functions are exchanged by alkanolamine or alkanolammonium salts in a particularly preferred embodiment and by triethanolamine, 1-amino-2-propanol or triethanolammonium hydrochloride in a very particularly preferred embodiment. The solutions can be shaded or blended with further anionic dyes, for example C.I Direct Yellow 137, C.I Direct Yellow 168, C.I Direct Yellow 147, C.I Direct Yellow 170, C.I Direct Yellow 148 and C.I Direct Yellow 157.

WO 01/90257 discloses a process for preparing solutions of anionic organic compounds, for example azo dyes containing at least one sulfo group, which comprises acidifying an aqueous solution or suspension of an anionic organic compound containing salts and/or impurities, so that the anionic organic compound is water-insoluble and precipitates in the form of the free acid and bringing the suspension to a salt content below 2% by weight, based on the total weight of the retentate, by means of ultrafiltration with a membrane having pore diameters of from 0.001 to 0.02 µm. Accordingly, the process constitutes a method of converting anionic organic compounds which are in a poorly soluble salt form into a readily soluble form by intermediate conversion of some or all of the acidic groups into the acid form and subsequently carrying out neutralization with appropriate bases.

However, a stable aqueous dye dispersion comprising an anionic direct dye in its acid form and a suitable additive is not yet known.

The object underlying the present invention is therefore to provide cost-effective and ecological formulations of direct dyes with high colour strength.

This object is achieved according to the present invention by an aqueous dye dispersion, comprising
(a) 2.0 to 30.0% by weight, based on the sum of (a), (b) and (c), of a dye of the formula (3)

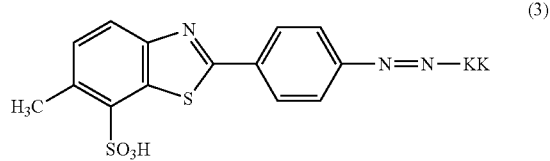

(3)

in which
KK is a residue of a coupling component; preferably of the acetoacetanilide, pyridone, pyrazolone or pyrimidine series;
(b) 0.1 to 20.0% by weight, based on the sum of (a), (b) and (c), of an additive selected from the group consisting of wetting agents, dispersing agents, rheology modifiers, and preservatives; and
(c) 50.0 to 97.9% by weight, based on the sum of (a), (b) and (c), of water.

As used herein the dye of formula (3) is referred to also as "(a)", the aforementioned additive as "(b)" and water as "(c)".

A preferred aqueous dye suspension according to the present invention comprises a dye of formula (3) in which the coupling component from which KK is derived is of the formula

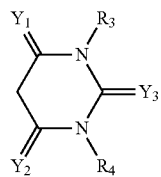

(4)

in which

Y$_1$ and Y$_2$ independently of one another are =O, =NH or =N—C$_1$-C$_4$alkyl, preferably being =O or =NH and being identical to each other, Y$_3$ is =O, =S, =NH, =N—C$_1$-C$_4$alkyl or =N—CN, especially =O, =NH or =N—CN and R$_3$ and R$_4$ independently of one another are each hydrogen, substituted or unsubstituted C$_1$-C$_6$alkyl or substituted or unsubstituted phenyl.

Within the scope of the above formula (4), C$_1$-C$_4$alkyl is, for example, methyl, ethyl, n-propyl, isopropyl, n-butyl, sec-butyl or tert-butyl. Where, in above formula (4), R$_3$ and R$_4$ are substituted or unsubstituted C$_1$-C$_6$alkyl, these are, for example, methyl, ethyl, n-propyl, isopropyl, n-butyl, sec-butyl or tert-butyl, straight-chain or branched pentyl or hexyl, or cyclohexyl, which may each be monosubstituted or polysubstituted, for example, by hydroxy, C$_1$-C$_4$alkoxy or C$_1$-C$_4$hydroxyalkoxy.

Examples of suitably substituted C$_1$-C$_6$alkyl are: methoxymethyl, ethoxymethyl, ethoxyethyl, ethoxypropyl, n-propoxymethyl, isopropoxymethyl, butoxymethyl, butoxyethyl, butoxypropyl, ethoxypropyl, methoxybutyl, ethoxypentyl and 2-hydroxyethoxypentyl.

Substituted or unsubstituted phenyl R$_3$ and R$_4$ can be, for example, phenyl itself or phenyl which is monosubstituted or polysubstituted by identical or different radicals.

Examples of such radicals are: methyl, ethyl, n-propyl, isopropyl, n-butyl, sec-butyl, tert-butyl, methoxy, ethoxy n-propoxy, isopropoxy, n-butoxy, sec-butoxy, tert-butoxy, halogen such as fluorine, chlorine or bromine or nitro.

Preferably R$_3$ and R$_4$ are unsubstituted phenyl.

Preferably, in the dye of formula (3), KK is derived from a coupling component selected from the formulae

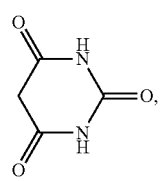

(7)

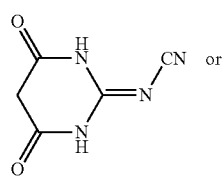

(8)

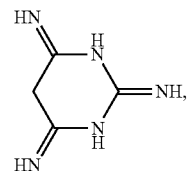

(9)

Preferred dyes of formula (3) according to the present invention are compounds of the formula:

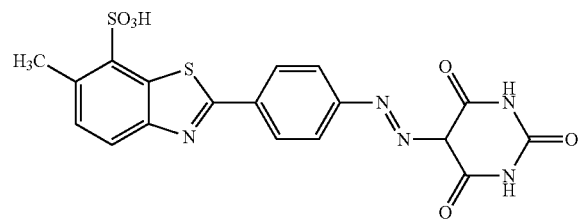 [SMILES: Cc1ccc2nc(-c3ccc(/N=N/C4C(=O)NC(=O)NC4=O)cc3)sc2c1S(=O)(=O)O]

Wetting agents used in accordance with embodiments of the present invention are in general used to wet the surface of dye particles. Suitable wetting agents are for example C$_{10}$-oxoalcohol ethoxylates with 3-8 ethylene oxide units, C$_{10}$—Guerbet alcohol ethoxylates with 3-8 ethylene oxide units, C$_{12-14}$ fatty alcohol ethoxylates with 3-8 ethylene oxide units, sodium salt of sulfonated oleic acid diisobutylamide, sodium salt of dibutyl naphthaline sulfonic acid, sodium di(2-ethylhexyl) sulfosuccinate, 2,4,7,9-tetramethyl-5-decyne-4,7-diol.

Dispersing agents used in accordance with embodiments of the present invention are in general used in order to hinder the formation of big dye aggregates that tend to sediment faster. Suitable dispersing agents may comprise aromatic compounds with negative groups, for example naphthalene sulfonic acid condensation products (for example as sodium salt: Tamol® NN 4501 of BASF S.A.). These compounds generally adsorb to the dye particles and impart them with a negative charge. As a result the negatively charged dye particles tend to repell each other. Another group of suitable dispersing agents comprises polymers that adsorb to the dye particles and thus hinder that the surfaces of the dye particles come into close contact, a phenomenon which may be called steric repellence.

Rheology modifiers (to be referred to also as "thickeners") provide the dispersion which comprises the dye in general with a structural viscosity (to be referred to also as "pseudoplastic behavior"). Suitable rheology modifiers are for example polyacrylamides or polysaccharides as for example xanthane (for example Kelzan®). Further suitable rheology modifiers are for example carbopoles (high molecular weight acrylic acid polymers), carboxy methyl cellulose, hydroxypropyl methyl cellulose (for example Klucel®), methyl cellulose, alginates, polyethylene glycol, polyvinylalcohol, polyvinylpyrrolidone and polyurethane based systems (for example Tafigel® PUR 61 of Münzing Chemie GmbH, Heilbronn).

Particularly preferred rheology modifiers are for example a hydrophobically modified acrylic acid polymer (obtainable for example from Münzing Chemie GmbH, Heilbronn under the tradename Tafigel® AP 10), a highly cross-linked hydrophilic acrylic polymer (obtainable for example from Ciba AG under the tradename Salcare® SC 92) and an anionic polyacrylamide with a low molecular weight (obtainable for example from Ciba AG under the tradename Rheovis® CTA-161. Furthermore, xanthane, an anionic polysaccharide produced from bacteria is a very suitable rheology modifier.

Sodium polyacrylate (for example Hydropalat® N from Cognis) may be used as dispersing agent and wetting agent.

Preservatives (to be referred to also as "biocides") used in embodiments of the present invention are in general used to protect the aqueous dye dispersions against microorganisms. Particularly preferred biocides used according to the present invention are 2-methyl-2H-isothiazol-3-one and 1,2-benzisothiazole-3(2H)-one, alone or in combination.

In a preferred aqueous dye dispersion, the additive (b) is selected from the group consisting of rheology modifiers and preservatives. Even more preferred, the aqueous dye dispersion comprises at least one rheology modifier.

In a particularly preferred embodiment, the aqueous dye dispersion of the present invention comprises
(a) 10.0 to 20.0% by weight, based on the sum of (a), (b) and (c), of a dye of the formula (3) in which KK is derived from a coupling component selected from the formulae

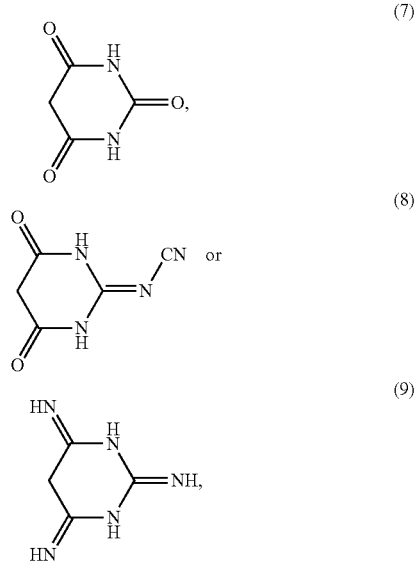

(b) 0.2 to 10.0% by weight, based on the sum of (a), (b) and (c), of at least one additive selected from the group consisting of wetting agents, dispersing agents, rheology modifiers, and preservatives; and
(c) 70.0 to 89.8% by weight, based on the sum of (a), (b) and (c), water.

The invention is also directed to a process for the preparation of aqueous dye dispersions, which comprises stirring a dye of formula (3), according to claim 1, with at least one additive selected from the group consisting of wetting agents, dispersing agents, rheology modifiers, and preservatives; and water, and, if desired, further additives.

The invention is moreover directed to the use of an aqueous dye dispersion, according to claim 1, for dyeing paper.

Finally, the invention is directed to paper, which has been dyed with an aqueous dye dispersion, as defined in claim 1.

Most preferably, the dye of formula (3) is the free acid form of C.I. Direct Yellow 137, C.I. Direct Yellow 147 or C.I. Direct Yellow 166 and the dispersions preferably contain from between 5 to 20% by weight of dye.

The dyes of formula (3) are either known compounds or may be prepared by known methods. The dyes of formula (3) may be obtained directly or by converting their salts into the free acids. The salts may comprise as cation for example lithium, potassium or sodium, ammonium mono-, di- or tri-$C_1$-$C_4$alkylammonium, mono-, di- or tri-$C_2$-$C_4$hydroxyalkylammonium or mono-, di- or tri-$C_2$-$C_4$hydroxyalkyl-$C_1$-$C_4$alkylammonium, whereby $C_1$-$C_4$alkyl is as previously defined. $C_2$-$C_4$hydroxyalkyl may, for example, be hydroxyethyl, hydroxypropyl or hydroxybutyl.

The dyes of formula (3) in the dispersion of the present invention are preferably obtained as follows from an aqueous synthesis solution or synthesis suspension which as well as the dye contains greater or lesser amounts of starting materials, byproducts, salts or other impurities. Where, in contrast, the dye of formula (3) is in solid form or in the form of a slurry or paste, it is first suspended in water to give an aqueous suspension or solution.

If the dye is already in the form of the free acid, then ultrafiltration is preferably carried out, in general immediately. If, on the other hand, it is in salt form, then the salt is preferably first converted into the free acid. In the case of compounds having two or more sulfo groups, it is sometimes advantageous to perform the conversion into the free acid in two or more stages at different pH values and/or temperatures.

To prepare the free acid, preferably an aqueous solution or suspension of the dye to be converted into the acid form containing salts and/or other impurities is acidified to a pH of 4.5 or below and is stirred or mixed until the dye has undergone almost complete conversion into the free acid and is therefore water-insoluble, and precipitates. This takes place preferably by the addition of a strong inorganic acid, for example hydrochloric acid or sulfuric acid, until the desired pH has been reached. The conversion takes place advantageously at a temperature between 15 and 140° C., in particular between 20 and 95° C. The optimum pH, the temperature, the concentration and the duration of mixing is in general to be adjusted for the particular dye and for the desired degree of substitution. The optimum conditions are easy to determine by means of suitable experiments.

In the case of dyes which are difficult to convert into the free acid, it may be useful first to subject the solution or suspension to partial desalination and only then to carry out the conversion into the free acid. This may be done, for example by nanofiltration or intermediate isolation of the anionic dye. Furthermore, it is possible to use special synthesis techniques to generate low-salt synthesis solutions, such as simultaneous diazotation and coupling.

Furthermore, a dye which has been only partly converted into the free acid can be washed until low in salt and then further acid can be added and can be stirred in or mixed in, at an elevated temperature if desired.

Washing and conversion into the free acid of formula (3) may also be carried out continuously in succession by circulating the suspension through an ultrafiltration module which is connected in series with a reactor for conversion into the free acid, and, if desired, for heating.

Ultrafiltration is conducted by means of customary methods using the known membranes. These membranes may comprise acid-resistant organic or inorganic material. Particularly suitable membranes are ceramic membranes, for ultrafiltration particularly those having a pore size of from 0.005 to 0.01 μm.

The temperature during the ultrafiltration is approximately between room temperature and about 95° C., preferably between 50 and 85° C. The pressure depends, inter alia, on the nature of the membrane, but is usually between 2 and 10 bar, preferably between 4 and 8 bar.

Washing and concentration by means of ultrafiltration is carried out until the desired salt content and the desired concentration of dye which is an anionic organic compound have been achieved. Normally, an inorganic salt content of below 2% by weight is preferred, preferably below 0.5% by weight, based on the total weight of the suspension.

Following ultrafiltration, the low-salt or salt-free suspension is in general admixed with at least one additive (b) selected from the group consisting of wetting agents, dispersing agents, rheology modifiers, and preservatives. Water and/or additional additives may be added depending on the intended dispersion and its use.

The aqueous dye dispersions according to the invention are, in general, prepared by stirring the free dye acids of formula (3) with at least one additive selected from the group consisting of wetting agents, dispersing agents, rheology modifiers, and preservatives, water, and, if desired, further additives, until a homogeneous solution has been formed. If necessary, the mixture can be heated, for example to 40-60° C., and possibly filtered.

The aqueous dye dispersions obtained according to the invention are notable, in particular, for a long shelf life, exhibiting neither sedimentation nor an increase in viscosity on storage.

The aqueous dye dispersions obtained according to the invention are used as they are or after dilution with water, particularly for dyeing and printing paper, including paperboard and cardboard, the dyeing of these materials being effected, for example, in the mass, by coating or by dipping.

The aqueous dye dispersions of the present invention have the advantage that they do not sediment. Moreover, the aqueous dye dispersions of the present invention allow a better and faster dyeing of paper. In addition, higher concentrated dye dispersions may be obtained. The dispersions of the present invention can be dissolved quickly in pulp suspensions and allow sometimes an easier and faster dilution with water (in particular in non-acid or buffered media) when compared to known dispersions where the salt form (sodium, lithium as cation) is used.

In addition it is possible to reduce the amount of organic waste in that it is possible to significantly reduce the amount of COD (Chemical Oxygen Demand). In particular, the invention allows to reduce the amount of additives and even the elimination of additives like for example amines that have no affinity for cellulose and that finally end up in waste water from which they have to be removed by an elaborate treatment.

Finally, the invention allows to produce with ease a modification via the reaction with specific cations. It is for example possible to produce scarcely soluble colour varnishes ("latent pigments"). The dyes may be fixed with polyamines and interesting colour effects may be obtained with high molecular polyacryl amines.

The following Examples illustrate the invention without intending to be restrictive in nature. Parts and percentages are by weight unless otherwise stated.

The direct yellow dyes used in the following Examples 1 to 10 were obtained by customary procedures via diazotation and subsequent coupling. Thereafter the direct yellow dyes were transformed into their respective acid form, washed salt-free by ultrafiltration and concentrated as described in WO 2001/090257. Thereafter the subsequent step as indicated below for each of Examples 1 to 10 was carried out.

EXAMPLE 1

To 40 g of a dispersion of Direct Yellow 166 with a dry content weight of 12.6% were added 10 g Tamol® NN4501 (BASF AG). The dispersion was then stirred at room temperature for 2 hours. The dispersion obtained showed good flowability at room temperature.

EXAMPLE 2

To 40 g of a dispersion of Direct Yellow 166 with a dry content weight of 12.6% were added 3 g Tamol® NN4501 (BASF SE). The dispersion was then stirred at room temperature for 15 minutes. The dispersion obtained showed good flowability. This sample showed good flowability and a lower settling behaviour than example 1.

EXAMPLE 3

To a dispersion of Direct Yellow 166 with a dry content weight of 12.6% were added 0.5 g of a cationic thickener (Salcare® SC92, Ciba AG). The dispersion was then stirred for 15 minutes. A stable dispersion is obtained with a high viscosity at low shear rates. This mixture is stable over a period of at least 6 months at room temperature.

EXAMPLE 4

From a suspension of Direct Yellow 147 with a dry weight content of 22% obtained from ultrafiltration, 1000 g were mixed with 0.11 g Hydropalat® N (Cognis GmbH) and stirred over night upon addition of glas beads. The dispersion obtained is stable for more than one year at room temperature.

EXAMPLE 5

From a suspension of Direct Yellow 147 obtained from ultra filtration with a dry weight content of 22%, 150 g were mixed with 0.45 g Tafigel® PUR61 (Münzing Chemie GmbH) and stirred over night upon addition of glas beads. The dispersion obtained is stable for more than one year at room temperature.

EXAMPLE 6

From a suspension of Direct Yellow 147 with a dry weight content of 22%, 150 g were mixed with 75 mg Tafigel® AP10 (Münzing Chemie GmbH) and stirred over night upon addition of glas beads. The dispersion obtained is stable for more than one year at room temperature.

EXAMPLE 7

A suspension of Direct Yellow 137 obtained from ultrafiltration, was concentrated to a dry weight content of 22%. 150 g of this suspension were mixed with 75 mg Tafigel® AP10 (Münzing Chemie GmbH) and stirred over night upon addition of glas beads. The dispersion obtained is stable for more than one year at room temperature.

EXAMPLE 8

A suspension of Direct Yellow 137 obtained from ultrafiltration, was concentrated to a dry weight content of 22%. 150 g of this suspension were mixed with 16 mg Hydropalat® N (Cognis GmbH) and stirred over night upon addition of glas beads. The dispersion obtained is stable for more than one year at room temperature.

EXAMPLE 9

To 747.5 parts by weight of a suspension of Direct Yellow 137 (relative color strength 135%; dry content: 15%) were added under stirring 250 parts bei weight of a 2% weight solution of xanthane (Kelzan® from CPKelco or Rhodopol® 23 from Rhodia) in water. This mixture is being preserved with 2.5 parts by weight Acticide® MBS 5050 (Thor GmbH). This mixture is stable over a period of at least 3 months.

EXAMPLE 10

To 747.5 parts by weight of a suspension of Direct Yellow 137 (relative color strength 134%; dry content: 15%) were added under stirring 40 parts bei weight Rheovis® CTA-161 (Ciba AG) and 210 parts by weight water. This mixture is being conserved with 2.5 parts by weight Acticide® MBS 5050 (Thor GmbH). This mixture is stable over a period of at least 3 months.

EXAMPLE 11

Storage Stability Test

The aqueous dye dispersion according to example 10 is storage stable: no change of the viscosity occurs after a storage test of 10 respectively 13 weeks at ambient temperature, 0 and 50° C. (see Table 1). Neither serum formation nor sediment formation occurs after 1 year of storage at ambient temperature (20-35° C.) as detected via tactile sense and visually.

TABLE 1

| Ex. Temp. | | start | 2 weeks | 4 weeks | 10 weeks |
|---|---|---|---|---|---|
| 0° C. | appearance | | homogeneous | homogeneous | homogeneous |
| | viscosity in mPa·s | | 3 400 (6 rpm) 2 700 (12 rpm) 2 000 (30 rpm) | 5 000 (6 rpm) 3 100 (12 rpm) 2 000 (30 rpm) | 6 000 (6 rpm) 4 000 (12 rpm) 3 500 (30 rpm) |
| | | start | 4 weeks | 7 weeks | 13 weeks |
| RT | appearance | homogeneous | homogeneous | homogeneous | homogeneous |
| | viscosity in mPa·s | 3 500 (6 rpm) 2 700 (12 rpm) 2 000 (30 rpm) | 3 500 (6 rpm) 2 000 (12 rpm) 1 900 (30 rpm) | 4 000 (6 rpm) 2 500 (12 rpm) 1 800 (30 rpm) | 3 400 (6 rpm) 2 600 (12 rpm) 1 800 (30 rpm |
| | | start | 2 weeks | 4 weeks | 10 weeks |
| 50° C. | appearance | | homogeneous | small serum formation, no sediment | small serum formation, no sediment |
| | viscosity in mPa·s | | 5 000 (6 rpm) 3 500 (12 rpm) 2 000 (30 rpm) | 3 600 (6 rpm) 2 600 (12 rpm) 1 800 (30 rpm) | 4 400 (6 rpm) 3 200 (12 rpm) 2 100 (30 rpm) |

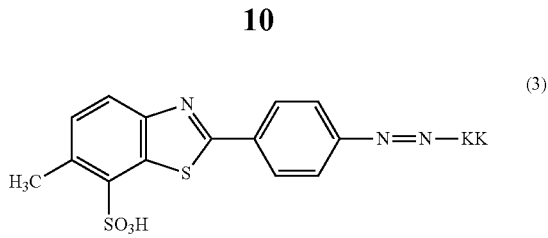

(3)

in which
KK is derived of the formula

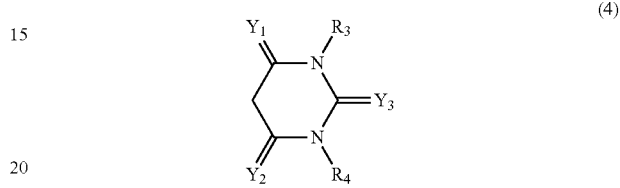

(4)

in which
Y$_1$ and Y$_2$ independently of one another are =O, =NH or =N—C$_1$-C$_4$alkyl,
Y$_3$ is =O, =S, =NH, =N—C$_1$-C$_4$alkyl or =N—CN and
R$_3$ and R$_4$ independently of one another are each hydrogen, substituted or unsubstituted C$_1$-C$_6$alkyl or substituted or unsubstituted phenyl;
(b) 0.1 to 20.0% by weight, based on the sum of (a), (b) and (c), of at least one additive selected from the group consisting of wetting agents, dispersing agents, rheology modifiers, and preservatives; and
(c) 50.0 to 97.9% by weight, based on the sum of (a), (b) and (c), of water.

2. The aqueous anionic direct dye dispersion of claim 1, which consists of the dye of formula (3) in which KK is derived from a coupling component selected from the formulae

The invention claimed is:
1. An aqueous anionic direct dye dispersion consisting of:
(a) 2.0 to 30.0% by weight, based on the sum of (a), (b) and (c), of an anionic direct dye of formula (3) shown below

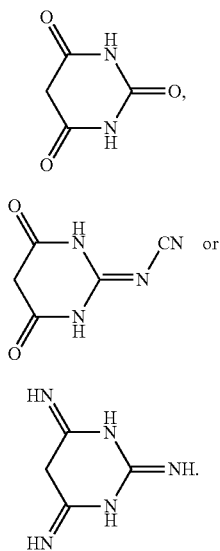

3. The aqueous anionic direct dye dispersion according to claim 1, wherein the additive (b) is selected from the group consisting of rheology modifiers and preservatives.

4. The aqueous anionic direct dye dispersion of claim 3, comprising at least one rheology modifier.

5. The aqueous anionic direct dye dispersion according to claim 1, which consists of
(a) 10.0 to 20.0% by weight, based on the sum of (a), (b) and (c), of the dye of formula (3) in which KK is derived from a coupling component selected from the formulae

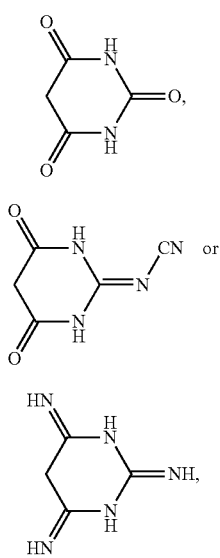

(b) 0.2 to 10.0% by weight, based on the sum of (a), (b) and (c), of at least one additive selected from the group consisting of wetting agents, dispersing agents, rheology modifiers, and preservatives; and
(c) 70.0 to 89.8% by weight, based on the sum of (a), (b) and (c), of water.

6. A process for the preparation of aqueous anionic direct dye dispersions, which comprises stirring a dye of formula (3), according to claim 1, with at least one additive selected from the group consisting of wetting agents, dispersing agents, rheology modifiers, and preservatives; and water, and optionally, further additives.

7. A method of dyeing paper comprising the step of coating or dipping said paper or adding to a pulp suspension the aqueous anionic direct dye dispersion, according to claim 1.

8. Paper, which has been dyed with an aqueous anionic direct dye dispersion, as defined in claim 1.

9. The aqueous anionic direct dye dispersion of claim 1, wherein
the wetting agent is selected from the group consisting of $C_{10}$-oxoalcohol ethoxylates with 3-8 ethylene oxide units, $C_{10}$— Guerbet alcohol ethoxylates with 3-8 ethylene oxide units, $C_{12-14}$ fatty alcohol ethoxylates with 3-8 ethylene oxide units, sodium salt of sulfonated oleic acid diisobutylamide, sodium salt of dibutyl naphthaline sulfonic acid, sodium di(2-ethylhexyl) sulfosuccinate and 2,4,7,9-tetramethyl-5-decyne-4,7-diol;
the dispersing agent is a naphthalene sulfonic acid condensation products or a polymer that adsorb to the dye particles and thus hinder that the surfaces of the dye particles come into close contact;
the rheology modifier is selected from the group consisting of polyacrylamides, polysaccharides, hydrophobically modified acrylic acid polymer, cross-linked hydrophilic acrylic polymer, carbopoles (high molecular weight acrylic acid polymers), carboxy methyl cellulose, hydroxypropyl methyl cellulose, methyl cellulose, alginates, polyethylene glycol, polyvinylalcohol, polyvinylpyrrolidone and polyurethane based systems;
the preservative is selected from the group consisting of 2-methyl-2H-isothiazol-3-one and 1,2-benzisothiazole-3(2H)-one, alone or in combination.

10. The aqueous anionic direct dye dispersion according to claim 1, wherein the dye of formula (2) is selected from the free acids of C.I. Direct Yellow 137, C.I. Direct Yellow 147 or C.I. Direct Yellow 166 and the dispersions contain from between 5 to 20% by weight of dye.

11. The aqueous anionic direct dye dispersion according to claim 1, wherein the dye of formula (3) is

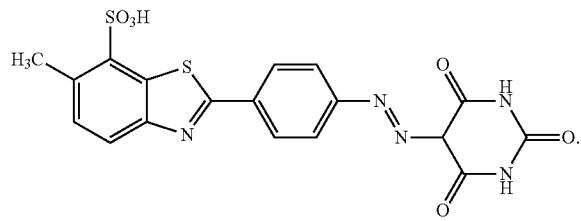 [SMILES: Cc1ccc2nc(-c3ccc(/N=N/C4C(=O)NC(=O)NC4=O)cc3)sc2c1S(=O)(=O)O]

12. The aqueous anionic direct dye dispersion according to claim 10, wherein the
the wetting agent is selected from the group consisting of $C_{10}$-oxoalcohol ethoxylates with 3-8 ethylene oxide units, $C_{10}$— Guerbet alcohol ethoxylates with 3-8 ethylene oxide units, $C_{12-14}$ fatty alcohol ethoxylates with 3-8 ethylene oxide units, sodium salt of sulfonated oleic acid diisobutylamide, sodium salt of dibutyl naphthaline sulfonic acid, sodium di(2-ethylhexyl) sulfosuccinate and 2,4,7,9-tetramethyl-5-decyne-4,7-diol;
the dispersing agent is a naphthalene sulfonic acid condensation products or a polymer that adsorb to the dye particles and thus hinder that the surfaces of the dye particles come into close contact;

the rheology modifier is selected from the group consisting of polyacrylamides, polysaccharides, hydrophobically modified acrylic acid polymer, cross-linked hydrophilic acrylic polymer, carbopoles (high molecular weight acrylic acid polymers), carboxy methyl cellulose, hydroxypropyl methyl cellulose, methyl cellulose, alginates, polyethylene glycol, polyvinylalcohol, polyvinylpyrrolidone and polyurethane based systems;

the preservative is selected from the group consisting of 2-methyl-2H-isothiazol-3-one and 1,2-benzisothiazole-3(2H)-one, alone or in combination.

13. The aqueous anionic direct dye dispersion according to claim 11, wherein the additive is a dispersing agent and is naphthalene sulfonic acid condensation product; or the additive is a rheology modifier and is selected from the group consisting of anionic polysaccharides, anionic polyacrylamides, hydrophobically modified acrylic acid polymers, cross-linked hydrophilic acrylic polymers, polyurethane based systems and sodium polyacrylates; or the additive is a preservative and is 2-methyl-2H-isothiazol-3-one or 1,2-benzisothiazole-3(2H)-one.

\* \* \* \* \*